J. R. CURRAN.

HOG OILER.

APPLICATION FILED APR. 26, 1919.

1,382,066. Patented June 21, 1921.

2 SHEETS—SHEET 1.

Witness:

A. W. Jamieson.

Inventor.

J. R. CURRAN,

By David O. Barnell,

Attorney.

J. R. CURRAN.
HOG OILER.
APPLICATION FILED APR. 26, 1919.

1,382,066. Patented June 21, 1921.

2 SHEETS—SHEET 2.

Inventor.

J. R. CURRAN.

Witness:

A. W. Jamieson.

By David O. Barnell

Attorney.

UNITED STATES PATENT OFFICE.

JAMES R. CURRAN, OF SHENANDOAH, IOWA.

HOG-OILER.

1,382,066. Specification of Letters Patent. Patented June 21, 1921.

Application filed April 26, 1919. Serial No. 292,970.

*To all whom it may concern:*

Be it known that I, JAMES R. CURRAN, a citizen of the United States, and a resident of Shenandoah, in the county of Page and State of Iowa, have invented certain new and useful Improvements in Hog-Oilers, of which the following is a specification.

My invention relates to daubing and rubbing devices for applying antivermin treatment and the like to swine. It is the general object of my invention to provide a simple, inexpensively constructed and efficient device of this character, which may be readily installed at a gate-opening through which the animals are obliged to pass, and thus automatically apply emollient, antiseptic, or antivermin oils, or the like, to each animal passing through the opening. More particular objects of my invention are to provide, in a device of the character indicated, oil-applying rollers mounted for relative movement toward and away from each other, whereby to simultaneously engage and rub or daub the oil upon the back and belly of an animal of any size; one of the oil-applying rollers comprising an oil-container adapted to automatically release therefrom quantities of the oil which are limited and proportioned substantially in accordance with the frequency with which the moving parts of the device are actuated by the passage of an animal through it. A further object of my invention is to provide a swinging support for one of the oil-applying rollers, provided with buffing means for retarding return movement thereof after it is lifted, whereby the support and roller are prevented from forcibly striking an animal following the one which has raised the swinging support by passing under the roller. Further objects of my invention will appear hereinafter.

Figures 1, 2:
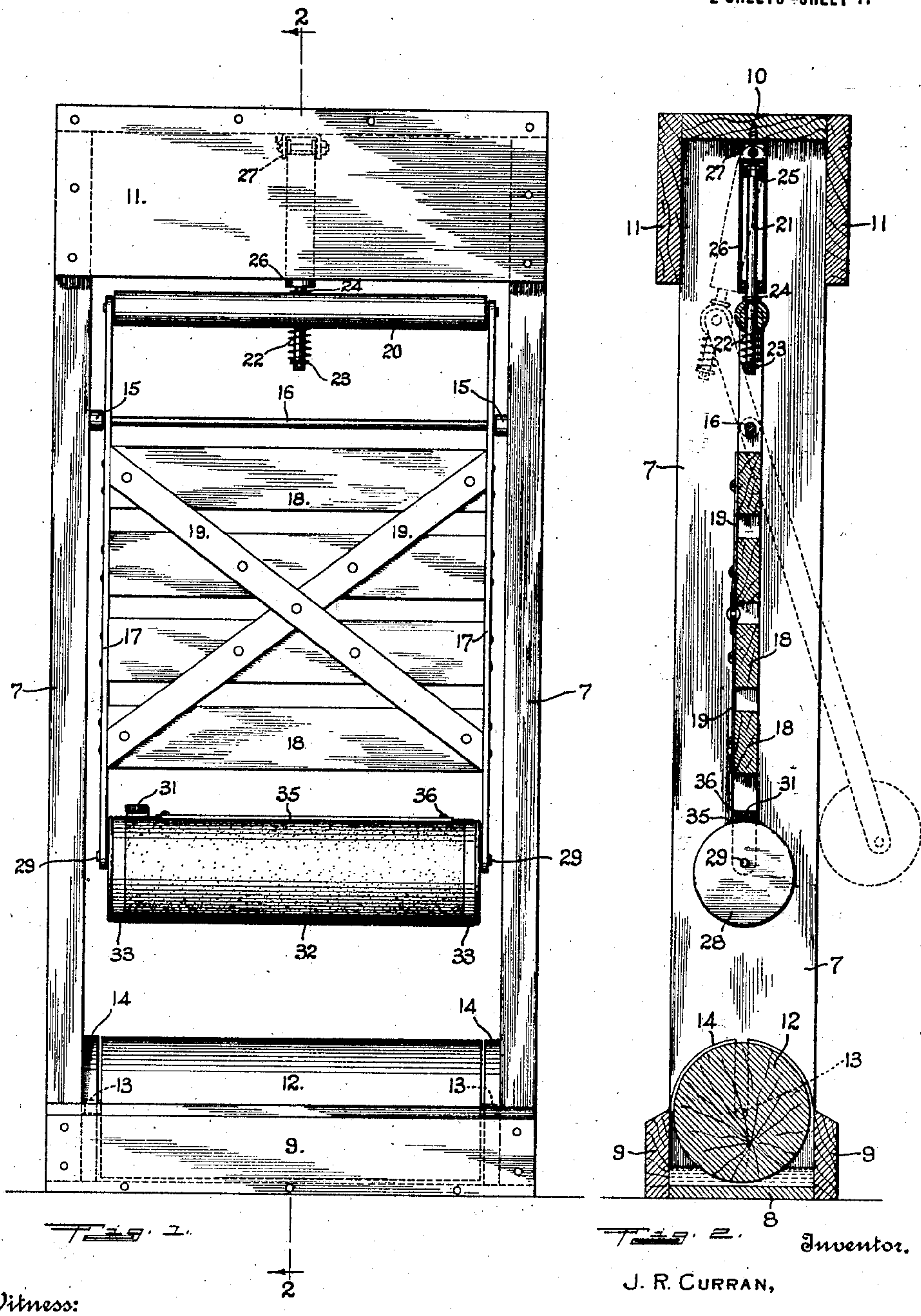
Figure 3:
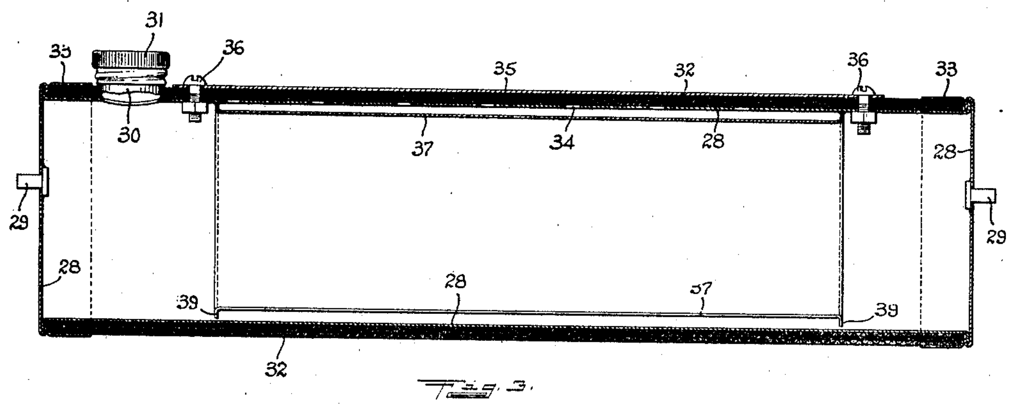
Figure 4:
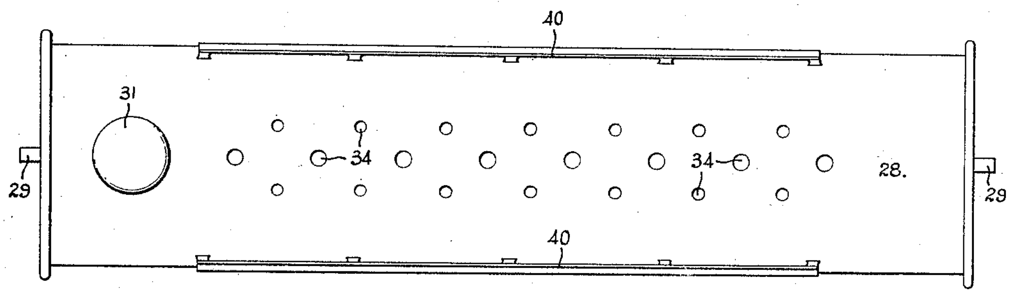
Figure 5:
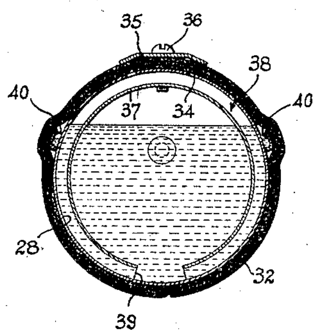
Figure 6:
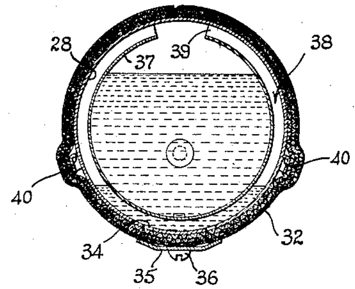

In the accompanying drawings Figure 1 is a front view of a device embodying my invention, Fig. 2 is a vertical section thereof, mainly on the line 2—2 of Fig. 1, Fig. 3 is a longitudinal section of the oil-cylinder, Fig. 4 is a plan view of the same with the absorbent covering omitted therefrom, and Figs. 5 and 6 are transverse sectional views of the cylinder, showing the operation of the oil-discharge limiting means.

In carrying out my invention according to the illustrated embodiment thereof, I provide an upright frame comprising side-pieces 7, lower cross-pieces 8 and 9 forming a transverse trough, and upper cross-pieces 10 and 11 forming a rectangular cap or hood. A roller 12 is mounted revolubly in the trough formed by the parts 8 and 9, said roller having at its ends stub-shafts 13 which rest removably in bearing-sockets formed in blocks 14 secured to the side-pieces 7 at the ends of the trough. In the upper intermediate portions of the side-pieces 7 short sections of pipe 15 are set in the inner sides thereof, said pipe-sections forming bearings for the ends of the pivot-rod 16 of the swinging roller-support or gate. The latter comprises vertical side-bars 17, a plurality of cross-bars 18 and brace-bars 19 rigidly connecting the side-bars, and an upper cylindrical bar or rod 20 which forms a partial counterbalance for the oil-cylinder or roller which is carried at the lower end of the gate. The rod 20 is pivotally connected with the side-bars 17, and at the center of the rod there is a vertical opening through which a part of the piston-rod 21 extends slidably. A spring 22 is disposed around the projecting lower end-portion of the piston-rod and bears against a cotter-retained washer 23 thereon, the spring normally holding a collar 24 in engagement with the upper side of the rod 20. The upper portion of the piston-rod carries a piston 25 which is slidable within a cylinder 26, the latter being pivotally connected at its upper end with a U-shaped hanger 27 secured to the upper cross-piece 10 of the main frame.

Referring now to the oil-cylinder or container carried by the gate or swinging support, said container has a main cylindrical body 28, made of sheet metal, and provided at its ends with eccentric trunnions 29 which fit in bearings therefor in the lower ends of the side-bars 17 of the gate, whereby the container is freely revoluble but normally assumes a position such as shown in Figs. 1, 2, 3 and 5, owing to the preponderance of weight at one side of the trunnion-axis. At its normally-upper side, near one end, the container is provided with a filling-tube 30 having a removable screw-cap 31. The body of the container is covered with layers 32 of absorbent fabric, held in place by means of metal bands 33 disposed around the same near the ends of the cylinder. At the normally-upper side of the container there are formed in the main body 28 a plurality of openings 34, arranged substantially as shown in Fig. 4. An elongated metal plate 35 is secured over said openings, outside of the absorbent covering 32, the ends of said plate being held by screws 36, whereby the pressure of the plate upon the fabric may be varied to limit and regulate the rate at which oil may pass through the openings and into the body of the absorbent material, it being obvious that the rate of absorption will be reduced when the material is compressed by tightening the screws and drawing the metal parts toward each other. Within the main body 28 of the container, and coextensive longitudinally with the perforate portion having the openings 34 therein, there is arranged a baffle-wall 37 which is formed of sheet metal and curved concentrically with the outer wall, being uniformly spaced therefrom to form an annular space 38, and the ends of said space being closed by transversely extending portions 39 united with the baffle and the outer wall. At its lower portion the longitudinal edges of the baffle are spaced apart to form between them an opening or slot by which the space 38 is connected with the main chamber of the casing. Thus, when the container is in the normal position shown in Fig. 5, the oil or fluid placed in the main chamber of the container flows up into the annular space 38, and when the container is rotated to the inverted position shown in Fig. 6, only the small amount of oil contained in said space 38 can escape through the openings 34, even should the container be held in the inverted position for a considerable time. On the outside of the body 28, but beneath the covering 32, there are two longitudinally extending L-shaped pieces 40, attached to the body adjacent to the upper or perforate side thereof, said pieces forming troughs or channels which may become filled with the oil passing beneath the absorbent covering, so that the troughs have a tendency to prevent flow of the oil around the container, and to limit the flow to that which seeps or passes by capillarity through the body of the absorbent covering. When the gate or swinging support is in the normal position shown in Fig. 2, any excess of oil in the covering of the container or upper roller will drip from the lower side thereof and fall onto the lower roller 12, so as to coat the surface thereof, and any further excess will be received in the trough formed by the lower cross-pieces 8 and 9 of the main frame.

The operation of the mechanism will be apparent. The container 28 is filled with oil, and initially a small charge of the oil may be placed in the lower trough, so that the lower roller 12 will dip therein and become coated with the oil when rotated. The frame of the device is disposed in a gate-opening of a fence or the door of a wall, so that animals must pass through the same to reach feed or water, or so that the animals may be driven therethrough. In passing beneath the swinging gate the same is lifted and swung out in the direction in which the animal is moving until there is sufficient space beneath the upper roller for the animal to pass beneath it. The roller being revolved by its frictional engagement with the back of the animal, oil from the absorbent covering is applied to the back, and the supply of oil in the covering is replenished by that which escapes from the openings 34 when the roller is in the inverted position. In passing over the lower roller 12 the legs and bellies of the animals are dragged thereon, the roller being thus revolved, and the oil being daubed and rubbed onto the engaged parts of the body. After the animal has passed under the gate the weight of the oil-container causes the same to swing back to normal position, and the return movement is retarded or cushioned by the air confined in the upper end of the cylinder 26, above the piston 25, so that the gate cannot forcibly strike a second animal should such a one be following directly behind the one by which the gate was raised. It may be noted that the spring 22 has a normal or initial compression such that the piston-rod will not slide through the bar 20 until the piston has been pulled down to the lower end of the air-cylinder, the spring then forming a yielding means permitting raising of the gate to an abnormal height.

Now, having described my invention, what I claim and desire to secure by Letters Patent is:

1. In a device of the class described, a frame, a gate mounted therein to swing about a horizontal axis and biased to assume normally a vertical position, a rotary cylindrical oil-container carried at the lower end of the swinging gate, said container having perforations at one side thereof, and means tending to keep the perforate side of the container uppermost.

2. In a device of the class described, a cylindrical oil-container disposed horizontally and provided with eccentric trunnions, a swinging support in which said trunnions are revoluble, the normally-upper side of said container being perforate, absorbent material covering the container, and means controlling the flow of oil through the perforations into said absorbent covering.

3. In a device of the class described, a fixed frame having a trough in the lower portion thereof, a roller revolubly mounted and dipping within said trough, a second roller provided with means for supplying fluid upon the surface thereof, a frame carrying said second roller and mounted in the fixed frame to swing therein about a horizontal axis, whereby the second roller is movable from and toward the first to vary the space between them, and said second roller forming a weight biasing the swinging frame to a position at which excess fluid from the second roller may drip upon the first roller and into the trough.

4. In a device of the class described, a cylindrical oil-container having perforations along one side thereof, an inclosed cylindrical baffle-wall in said container forming an annular chamber adjoining the perforate side thereof, said annular chamber communicating with the main chamber of the container at the side opposite the perforations, and means for revolubly mounting the container on an axis such that it will normally assume a position with the perforate side uppermost.

5. An applicator for live stock comprising a pair of spaced standards, and medicament applying means mounted thereon and including a tank mounted for rotary movement and provided longitudinally with a series of outlet perforations for the contained fluid, the tank being freely rotatable to apply the medicament by an animal passing there beneath and contacting therewith, and being adapted automatically to normally occupy such rotated position as to shut off the flow of the contained fluid through said perforations.

6. An applicator for live stock comprising a pair of spaced standards and medicament applying means mounted thereon and including a tank mounted for rotary movement and provided longitudinally with a series of outlet perforations for the contained fluid, the tank being freely rotatable to apply the medicament by an animal passing therebeneath and contacting therewith, the tank having its center of rotation between its center of gravity and the perforations whereby the tank will normally occupy such rotated position as to shut off the flow of the contained fluid through said perforations.

7. In combination with the structure disclosed in claim 6, an absorbent cover fixed to and enveloping the tank and receiving the medicament from the tank through said perforations.

JAMES R. CURRAN.